Aug. 31, 1965   E. R. BERGSTRÖM   3,203,493
DEEP-HOLE DRILL
Filed May 3, 1963   2 Sheets-Sheet 1
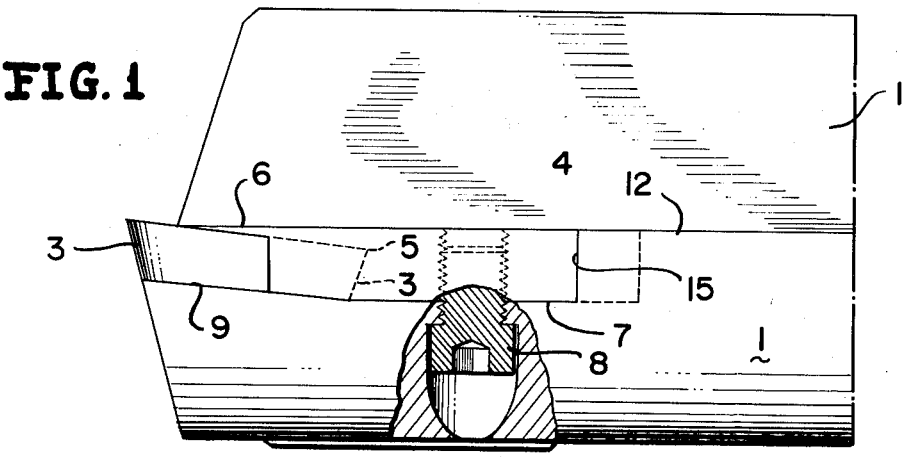
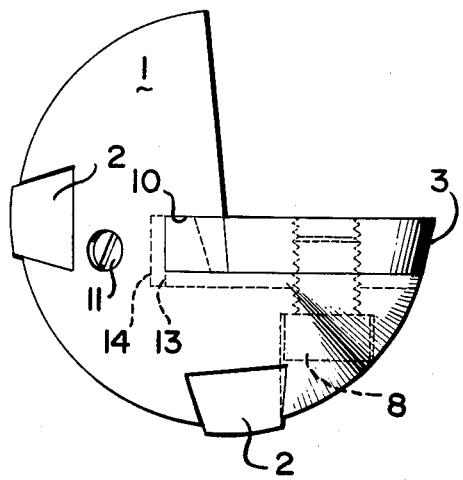
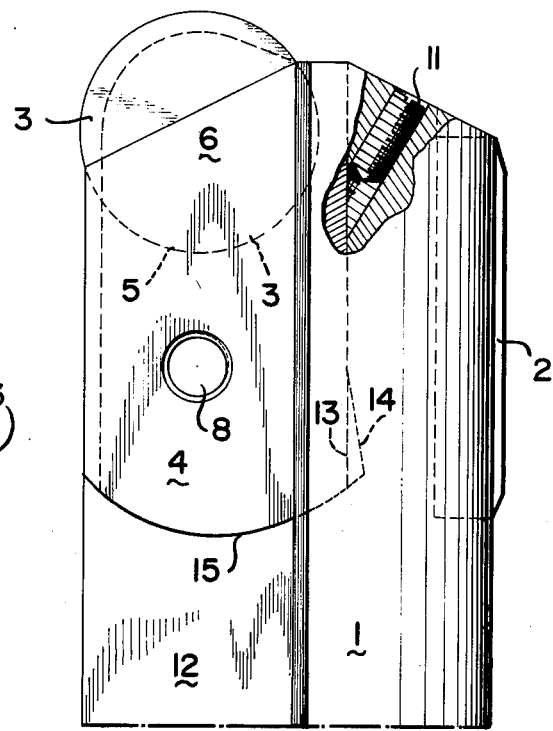
INVENTOR
ERNST REIDAR BERGSTRÖM Aug. 31, 1965   E. R. BERGSTRÖM   3,203,493
DEEP-HOLE DRILL Filed May 3, 1963   2 Sheets-Sheet 2

INVENTOR
ERNST REIDAR BERGSTRÖM

BY
ATTORNEYS

United States Patent Office 3,203,493
Patented Aug. 31, 1965

3,203,493
DEEP-HOLE DRILL
Ernst Reidar Bergström, Stockholm, Sweden, assignor to Stora Kopparbergs Bergslags Aktiebolag, Falun, Sweden, a joint-stock company of Sweden
Filed May 3, 1963, Ser. No. 277,892
7 Claims. (Cl. 175—383)

The present invention relates to drills of the type called deep-hole drills or gun drills. This type of drill is used for providing holes with a considerable greater length as compared with their diameter.

A severe drawback of hitherto known drills of this type consists in that it is difficult or not possible at all to alter or vary the effective cutting diameter of the drills.

The present invention has for its main object to provide a deep-hole drill the effective diameter of which is easily variable between wide limits.

Another object is to provide simple but effective means for changing the position of a swingable cutter holder so as to vary the diameter.

A still further object of the invention is to provide positive and reliable mounting of the cutter and its holder in the body of the drill.

It will be seen, that by fixing the cutter holder in arbitrarily chosen positions the effective diameter of the deep-hole drill will be easily and quickly changed at will. It is likewise easy to fasten the holder and the cutter in the chosen positions.

These and other features of the invention will be disclosed more in detail through the following description, reference being had to the accompanying drawings, in which:

FIG. 1 is, a side view partly in section, of an embodiment of a drill according to the invention.

FIG. 2 is an end view seen from the left in FIGURE 1.

FIG. 3 is a plan view.

Figures 4, 5:
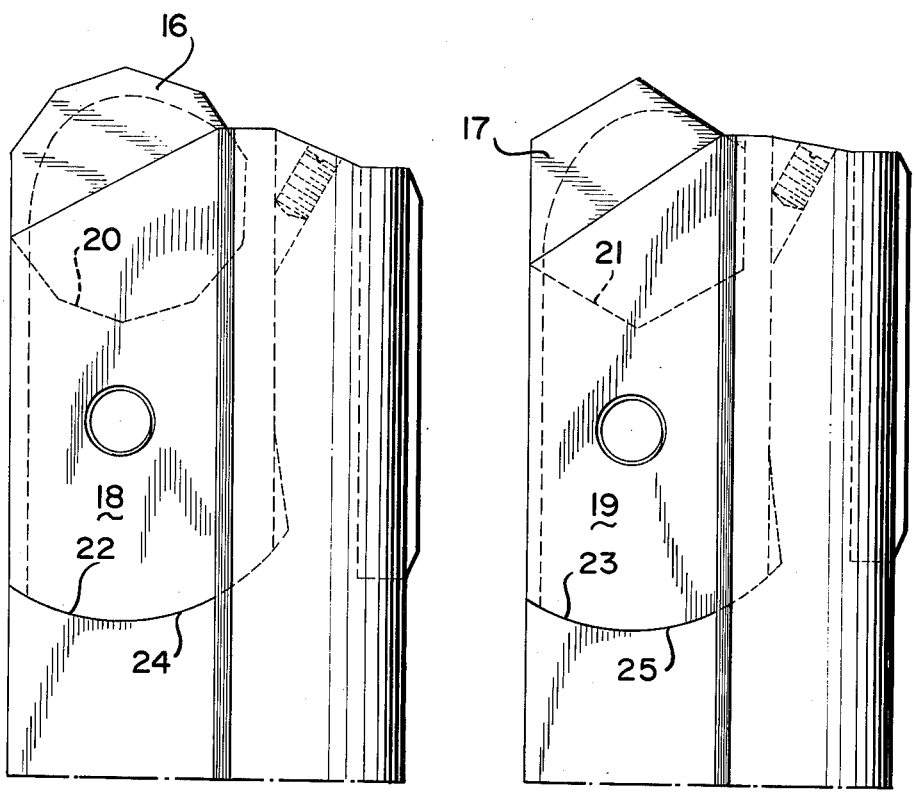
FIG. 4 is a plan view, similar to FIG. 3, of another embodiment.
FIG. 5 is a plan view, similar to FIG. 3 and FIG. 4, of a third embodiment.

Reference is first had to the embodiment shown in FIGS. 1–3, where 1 designates the body of the drill in question. The body is provided with built-in wear or glide inserts 2.

In accordance with the principle of the present invention the drill has a cutting plate or blade 3 consisting for instance of so called hard metal or the like and being rotatable and fastened in various or selected rotated positions by means of a clamping or holding member 4.

Further in accordance with the principle of the invention the cutter is mounted in a holding member which is swingably connected to the drill rod or body in order to vary the effective cutting diameter of the drill.

The cutting blade 3 has a circular or polygonal form, and the holding member 4 has a circular seat 5 corresponding to the maximum diameter of the cutting blade 3. The holding member 4 has further a portion 6 projecting over the plate or blade 3. The portion 6 is adapted to prevent the cutting blade from being lifted from its position when drilling is being performed.

The holding member 4 is clamped against a base surface 7 and/or against the cutting blade 3 by means of a screw 8 threaded in the member 4 and arranged in the body 1.

It is thus possible to adjust the cutting blade 3 in arbitrary rotational positions and to fix the same in these positions by tightening the screw 8. When a certain portion of the cutting blade has been worn it is possible to reposition the cutting blade so that a new cutting portion will be used. The cutting blade is provided with cutting portions all around its circumference.

As is apparent from FIGURES 1 and 2, the cutting blade 3 is frusto-conical, that is it has a certain clearance angle. This angle may be such that the under surface 9 of the cutting blade is slightly sloping, for instance 1–10°, suitably about 5°, upwardly from the base surface 7 of the holding member 4. The portion 6 is accordingly diminishing towards the actual cutting portion of the cutting blade.

The recess or seat 5 in the holding member 4 is open forwardly and outwardly in respect of the drilling direction in correspondence to the stresses occuring in the drilling work, so that the cutting blade will be automatically pressed into its seat.

The holding member 4 extends partly into a recess 10 in the body 1. The recess 10 has approximately the same height as the holding member, and it is adapted to prevent the said member from being lifted from its correct operating position. The bottom side of the recess is suitably flush with the base surface 7 for the member 4.

The member 4 is together with the cutting blade 3 swingable about the screw 8 which also serves as a fulcrum member. By swinging the parts 3, 4 it is possible to vary the effective diameter of the drill within wide limits.

Adjusting and securing of the parts 3, 4 in different diameter positions is easily carried out by means of an adjusting screw 11, which is threaded into the body 1 and screwable into the recess 10 where it has contact with the member 4.

The holding member 4 is advantageously but not necessarily recessed into the surface 12 on the body 1, and the said member may be adapted to abut against side walls of the recess. A certain play must exist at 13 and 14 in order to allow for the above mentioned swinging movement. The screw 8 may have a sufficient play in the body 1 to allow for a considerable swinging motion as well as for a firm abutment against for instance the wall 15 of the recess (see FIG. 1).

The very exact, easy and fast adjustment by means of the adjustment screw 11 offers previously unknown possibilities in respect of an exact work, and the possibility or turning or rotating the cutting blade 3 allows for maximal use of the cutting blade before regrinding. The blade 3 may have a plurality of positions before its regrinding.

As will be clear from above the invention offers very considerable saving in respect of time and material.

In the embodiments shown in FIGURES 4 and 5 the cutting blades 16 and 17, respectively, have ten and six edges, respectively, and the holding members 18 and 19, respectively, have corresponding seats 20 and 21, respectively.

The holding members 18 and 19 have a rounded form at their rear ends 24 and 25, respectively, and their corresponding recess walls 22 and 23, respectively, have corresponding rounded forms as clearly shown in the figures. These rounded intercorresponding formations are well adapted to allow for the swingablity of the holding member as well as to form effective abutments.

Obviously further embodiments than those here referred to as examples are possible within the scope of the invention. Thus, other forms are possible in respect of the swingable holder and the rotatable cutting blades. Instead of the regular forms of the cutting blade more or less irregular polygonal forms may be used. Likewise the holding members may be varied considerably within the scope of the invention.

I claim:

1. A deep-hole drill comprising a drill rod having a longitudinal laterally extending base, a rotatably adjustable blade having a peripheral cutting edge and resting on said base, a holding member resting on the base in rear of the blade and having a front seat for the blade conforming to the said edge of the blade, said holding member having a forward portion projecting over part of the blade, and means for clamping the holding member to said drill rod.

2. A deep-hole drill comprising a drill rod having a longitudinal laterally extending base, a rotatably adjustable blade having a peripheral cutting edge and resting on said base, a holding member pivotally mounted on the base in rear of the blade and having a front seat for the blade conforming to the said edge of the blade, said holding member having a forward portion projecting over part of the blade, and means for clamping the holding member to said drill rod in pivotally adjusted position with the blade adjustably extended radially.

3. A deep hole-drill as defined in claim 2, in which said means for clamping the holding member to said drill rod comprises a screw passing through the midpoint of said holding member.

4. A deep-hole drill as defined in claim 2, in which the inner end of said base is recessed into said drill rod.

5. A deep-hole drill comprising a drill rod having a one of its ends a substantially V-shaped depression in the longitudinal periphery thereof, one face of said depression providing a longitudinal laterally extending base and the opposite face of said depression being provided with a recessed area, a rotatably adjustable blade having a peripheral cutting edge and resting on said base, a holding member pivotally mounted on the base in the rear of the blade with one of its edges in said recessed area, said member having a front seat for the blade conforming to the said edge of the latter, said holding member having a forward portion projecting over part of the blade, and means for clamping the holding member to said drill rod in pivotally adjusted position with the blade adjustably extended radially.

6. A deep-hole drill as defined in claim 5 in which said means for clamping the holding member to said drill rod is a screw in the base passing through the midpoint of the holding member and the recessed area back of the screw is deepened to receive the holding member in pivotally adjusted position.

7. A deep-hole drill as defined in claim 5 in which an adjusting screw in the drill rod engages the edge of the holding member in the recessed area to hold the member in pivotally adjusted position with the blade extended.

References Cited by the Examiner
UNITED STATES PATENTS

| | | | |
|---|---|---|---|
| 402,394 | 4/89 | Brown | 175—384 X |
| 522,403 | 7/94 | Calkins | 175—398 X |
| 1,468,774 | 9/23 | Caldwell | 175—384 X |
| 1,578,574 | 3/26 | Bateman | 175—351 X |
| 1,638,337 | 8/27 | Hutton | 175—373 X |
| 2,930,588 | 3/60 | Lord | 175—410 X |

BENJAMIN BENDETT, *Examiner.*

CHARLES E. O'CONNELL, *Primary Examiner.*